June 10, 1958  R. J. WHITE  2,837,782
RESILIENT RETAINING FRAME FOR GLASS PANELS
Filed Aug. 13, 1957

INVENTOR.
ROBERT J. WHITE
BY
ATTORNEY

United States Patent Office 2,837,782
Patented June 10, 1958

2,837,782

RESILIENT RETAINING FRAME FOR GLASS PANELS

Robert J. White, Toledo, Ohio

Application August 13, 1957, Serial No. 677,925

1 Claim. (Cl. 20—56)

This invention relates to storm sashes or sealing strips for windows and an object is to produce a simple and inexpensive rubber-like sealing strip which can be conveniently applied to a glass panel and when in applied position can be handled as a unit readily so that the glass panel with the strip engaging the edge portion thereof can be mounted in position of use in a window opening or removed without difficulty, the handle additionally a part of the strip itself and reinforcing and strengthening the marginal edge portion thereof.

Figure 1:
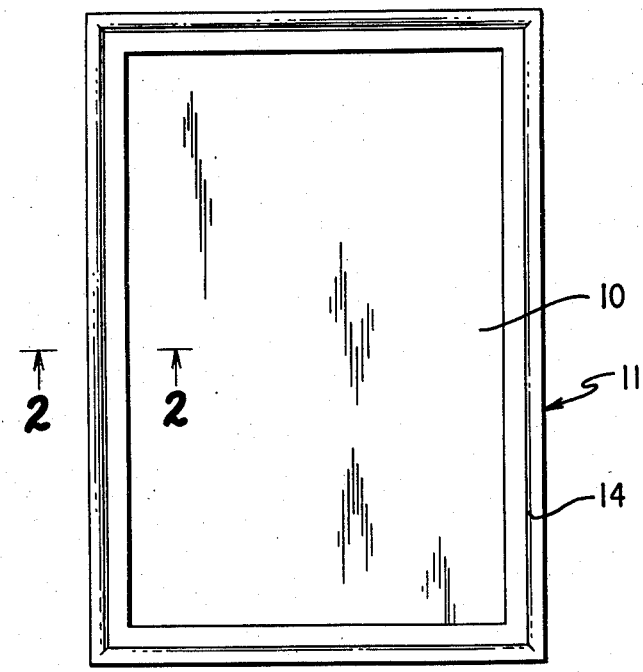
Figure 2:
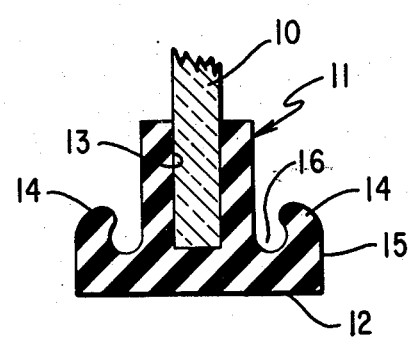

Other objects and advantages of the invention will hereinafter appear and for purposes of illustration but not of limitation, an embodiment of the invention is shown on the accompanying drawings in which Figure 1 is a front view of a glass panel with the sealing strip mounted thereon; and Figure 2 is an enlarged transverse sectional view on the line 2—2 of Figure 1.

The illustrated embodiment of the invention comprises a rectangular glass panel 10, the edge portion of which is enclosed by a rubber-like molding or strip 11. The strip 11 may be of one piece or in sections as desired and is of rubber or similar material which has a resilient or deformable characteristics. Particularly as shown on Figure 2, the strip has a flat frame engaging and sealing surface 12 which can be pressed against the window frame for sealing a window after the manner of a storm sash. Opposite to the surface 12 is a relatively deep glass panel receiving socket 13 which extends entirely around the strip as will be readily understood so as completely to enclose the edge portion of the panel. If desired, the glass panel may be secured in the socket 13 by suitable adhesive but this is not imperative. The outer sides of the portion forming the socket 13 provide flat surfaces parallel to the inner sides of the socket 13. It will be observed that the sealing surface 12 extends substantially beyond the socket portion, thereby not only providing an exceedingly wide sealing surface but also providing a place for inside and outside integral rounded ribs 14. Thus on opposite sides of the glass panel 10 are ribs 14 which extend entirely around the panel. Note that the outer surface 15 is flat and at right angles to the sealing surface 12 and inwardly of each of the ribs 14 is a rounded or curved groove. It will be noted that the inner portions of the ribs extend inwardly toward the socket portion, thereby to provide a convenient hand grasping portion for pulling the assembly out from its installed position and also providing a greater abutment like part for assisting in the mounting and removal operations.

In use the ribs 14 enable one to grasp the entire unit and push it into place. Thus the ribs serve as handles so that the window panel may be mounted in position of use or removed without difficulty. In addition the enlargement provided by the ribs 14 strengthens and reinforces the edge portions of the strip as will be readily understood and militate against excessive flexing of the edge portions of the strip.

It will be manifest that I have produced an exceedingly simple and inexpensive sealing strip which can be readily applied to a glass panel and provides a storm sash which can be mounted in position of use or removed without difficulty and without the use of special tools. The handles provided by the ribs 14 make possible such easy application and removal of the panel.

It will be understood that numerous changes in details of construction, arrangement and choice of materials may be effected without departing from the spirit of the invention, especially as defined in the appended claim.

What I claim is:

A resilient mounting for glass panels comprising a one-piece open frame of resilient rubber-like material, said frame having an outwardly flat sealing surface around the outer periphery thereof, an inwardly open glass panel receiving socket at right angles to said surface integral with and extending around the inner periphery of the frame, said frame having integral lateral extensions, one on each side of said socket, and an inwardly extending integral rib around the inner periphery of each of said frame extensions and co-extensive with the outer edge portions thereof, said ribs being laterally spaced from said socket and providing handles for installing said frame.

References Cited in the file of this patent

UNITED STATES PATENTS 2,050,733    Ross _____ Aug. 11, 1936